US009226030B2

(12) United States Patent
Yamada

(10) Patent No.: US 9,226,030 B2
(45) Date of Patent: Dec. 29, 2015

(54) PROGRAM SCHEDULE GENERATING DEVICE AND PROGRAM SCHEDULE GENERATING METHOD

(75) Inventor: Kazuhiko Yamada, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 71 days.

(21) Appl. No.: 14/357,092

(22) PCT Filed: May 23, 2012

(86) PCT No.: PCT/JP2012/063122
§ 371 (c)(1), (2), (4) Date: May 8, 2014

(87) PCT Pub. No.: WO2013/088758
PCT Pub. Date: Jun. 20, 2013

(65) Prior Publication Data
US 2015/0237397 A1 Aug. 20, 2015

(30) Foreign Application Priority Data
Dec. 15, 2011 (JP) ................................ 2011-274139

(51) Int. Cl.
*G06F 13/00* (2006.01)
*G06F 3/00* (2006.01)
*H04N 5/445* (2011.01)
*H04N 21/462* (2011.01)
(Continued)

(52) U.S. Cl.
CPC ......... *H04N 21/462* (2013.01); *H04N 21/4314* (2013.01); *H04N 21/4586* (2013.01); *H04N 21/4821* (2013.01); *H04N 21/4823* (2013.01); *H04N 21/854* (2013.01)

(58) Field of Classification Search
CPC ........... H04N 5/44543; H04N 21/482; H04N 21/4622; H04N 21/47214; H04N 21/4821
See application file for complete search history.

(56) References Cited

U.S. PATENT DOCUMENTS 5,539,428 A * 7/1996 Bril et al. ................. G09G 5/22 345/471
7,607,151 B2 10/2009 Yamada et al.
(Continued)

FOREIGN PATENT DOCUMENTS

JP 10-42207 A 2/1998
JP 11-275484 A 10/1999
(Continued)

*Primary Examiner* — Hunter B Lonsberry
(74) *Attorney, Agent, or Firm* — Birch, Stewart, Kolasch & Birch, LLP

(57) ABSTRACT

A program schedule generating device includes a program schedule individual data generating unit that generates program schedule individual data including graphics rendering definitions for using raw material data to form images indicating display information, and raw material data reference information indicating the positions on video memory at which the raw material data used in the graphics rendering definitions are stored, a program schedule display list generating unit that generates a program schedule display list indicating the positions at which to display the image rendered on the basis of the program schedule individual data for each item of the program schedule individual data, and a rendering unit that renders the image for each program by use of the raw material data on the basis of the program schedule individual data and places the rendered image on the basis of the program schedule display list, thereby generating the screen data for a program schedule screen.

18 Claims, 10 Drawing Sheets

120

| RAW MATERIAL TYPE (120a) | REGISTRATION NAME (120b) | EXPANSION ADDRESS (120c) | |
|---|---|---|---|
| 01 | Font_001 | 0x06000000 | ← RAW MATERIAL A |
| 01 | Font_002 | 0x0604B000 | |
| 01 | Font_003 | 0x06250000 | |
| 02 | Path_001 | 0x07000000 | ← RAW MATERIAL B |
| 02 | Path_002 | 0x07000084 | |
| 02 | Path_003 | 0x070000A8 | |
| ⋮ | ⋮ | ⋮ | |

(51) Int. Cl.

| | |
|---|---|
| ***H04N 21/431*** | (2011.01) |
| ***H04N 21/458*** | (2011.01) |
| ***H04N 21/854*** | (2011.01) |
| ***H04N 21/482*** | (2011.01) |

(56) References Cited

U.S. PATENT DOCUMENTS

| | | | | |
|---|---|---|---|---|
| 2001/0011373 | A1* | 8/2001 | Inoue ................. | H04N 5/44543 725/50 |
| 2009/0113479 | A1 | 4/2009 | Tomita | |

FOREIGN PATENT DOCUMENTS

| | | | |
|---|---|---|---|
| JP | 2000-307969 | A | 11/2000 |
| JP | 2001-160932 | A | 6/2001 |
| JP | 2001-218127 | A | 8/2001 |
| JP | 2001-257649 | A | 9/2001 |
| JP | 2002-232805 | A | 8/2002 |
| JP | 2003-32567 | A | 1/2003 |
| JP | 2005-203955 | A | 7/2005 |
| JP | 2007-28076 | A | 2/2007 |
| JP | 2007-49590 | A | 2/2007 |
| JP | 2008-309933 | A | 12/2008 |
| JP | 2009-111863 | A | 5/2009 |

* cited by examiner

| RAW MATERIAL TYPE (120a) | REGISTRATION NAME (120b) | EXPANSION ADDRESS (120c) | |
|---|---|---|---|
| 01 | Font_001 | 0x06000000 | ← RAW MATERIAL A |
| 01 | Font_002 | 0x0604B000 | |
| 01 | Font_003 | 0x06250000 | |
| 02 | Path_001 | 0x07000000 | ← RAW MATERIAL B |
| 02 | Path_002 | 0x07000084 | |
| 02 | Path_003 | 0x070000A8 | |
| ⋮ | ⋮ | ⋮ | |

| FONT ID (130a) | CHARACTER CODE (130b) | REFERENCE ADDRESS (130c) | SIZE (130d) | |
|---|---|---|---|---|
| ⋮ | ⋮ | ⋮ | ⋮ | |
| 003 | 304A | 0x000F4E20 | 518 | ← O |
| 003 | 304B | 0x000F5020 | 394 | ← KA |
| 003 | 304C | 0x000F51B0 | 462 | ← GA |
| 003 | 304D | 0x000F537E | 390 | ← KI |
| ⋮ | ⋮ | ⋮ | ⋮ | |
| 003 | 306F | 0x000F8086 | 432 | ← HA |
| ⋮ | ⋮ | ⋮ | ⋮ | |

```
PROGRAM DATA GENERATING INFORMATION() {
  PROGRAM ID,
  BROADCAST STATION ID,
  BROADCAST STATION NAME,
  START TIME,
  END TIME,
  GENRE,
  TITLE,
  PROGRAM SUMMARY,
  DATA ADDRESS,
}

DISPLAY REFERENCE POSITION() {
  BROADCAST STATION ID,
  TIME,
}
```

| | |
|---|---|
| 0x00000140, | 160a |
| 0x04000000, | 160b |
| PLACED, ID=0, DEPTH=0, ･･･,<br>PLACED, ID=1, DEPTH=1,<br>PLACED, ID=2, DEPTH=2, DISPLACEMENT=30,<br>⋮<br>PLACED, ID=120, DEPTH=126, DISPLACEMENT X=200, DISPLACEMENT Y=180,<br>END OF FRAME | 160c |
| ⋮<br>0x00344E20,<br>0x00348086,<br>0x0034A6F8,<br>⋮ | 160d |

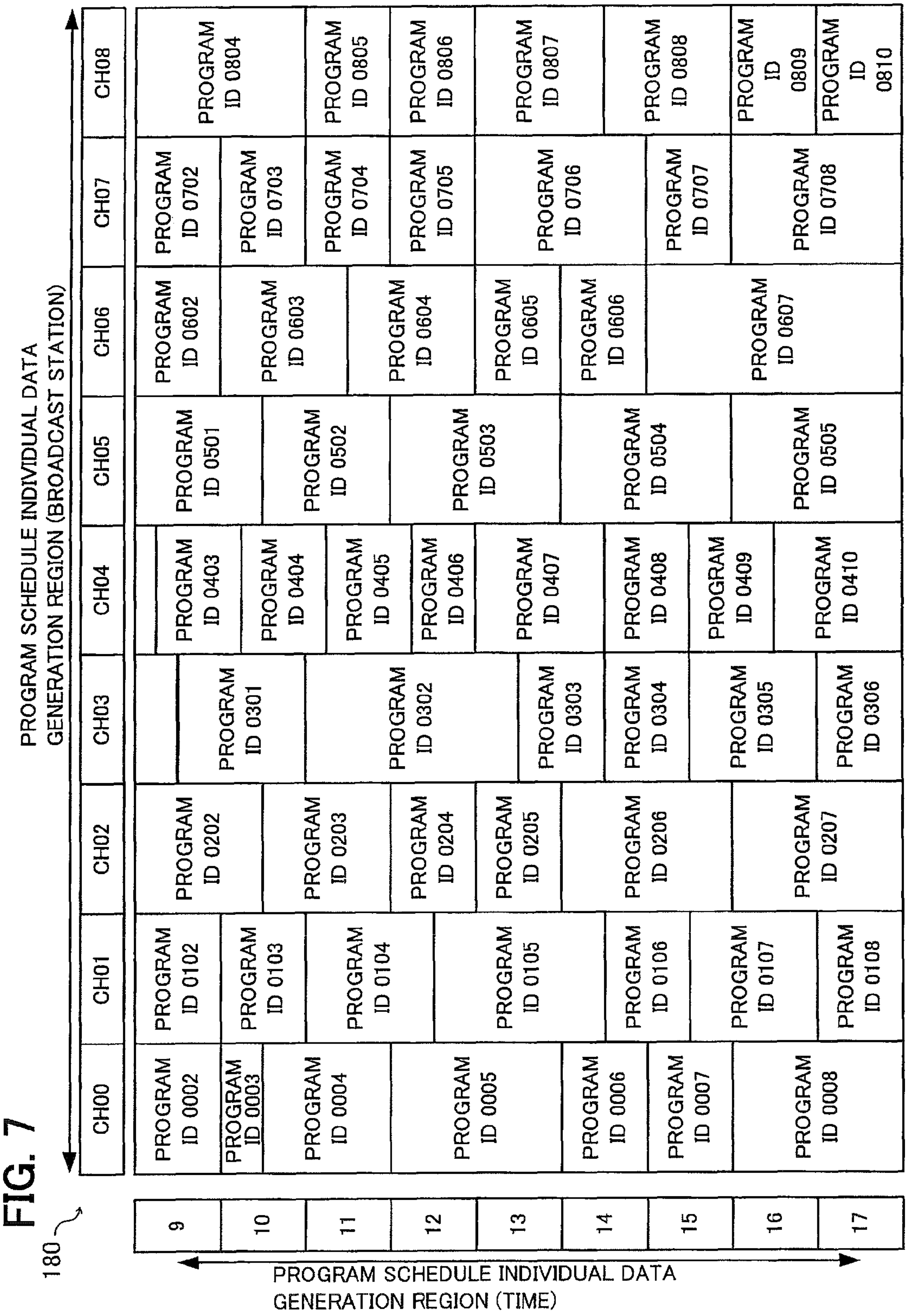

FIG. 7

PROGRAM SCHEDULE INDIVIDUAL DATA GENERATION REGION (BROADCAST STATION)

| | CH00 | CH01 | CH02 | CH03 | CH04 | CH05 | CH06 | CH07 | CH08 |
|---|---|---|---|---|---|---|---|---|---|
| 9 | PROGRAM ID 0002 | PROGRAM ID 0102 | PROGRAM ID 0202 | | | | PROGRAM ID 0602 | PROGRAM ID 0702 | PROGRAM ID 0804 |
| 10 | PROGRAM ID 0003 | PROGRAM ID 0103 | | PROGRAM ID 0301 | PROGRAM ID 0403 | PROGRAM ID 0501 | | PROGRAM ID 0703 | |
| 11 | PROGRAM ID 0004 | PROGRAM ID 0104 | PROGRAM ID 0203 | | PROGRAM ID 0404 | | PROGRAM ID 0603 | | PROGRAM ID 0805 |
| 12 | | | PROGRAM ID 0204 | PROGRAM ID 0302 | PROGRAM ID 0405 | PROGRAM ID 0502 | | PROGRAM ID 0704 | PROGRAM ID 0806 |
| 13 | PROGRAM ID 0005 | PROGRAM ID 0105 | PROGRAM ID 0205 | PROGRAM ID 0303 | PROGRAM ID 0406 | PROGRAM ID 0503 | PROGRAM ID 0604 | PROGRAM ID 0705 | PROGRAM ID 0807 |
| 14 | PROGRAM ID 0006 | PROGRAM ID 0106 | PROGRAM ID 0206 | PROGRAM ID 0304 | PROGRAM ID 0407 | | PROGRAM ID 0605 | PROGRAM ID 0706 | |
| 15 | PROGRAM ID 0007 | PROGRAM ID 0107 | PROGRAM ID 0207 | PROGRAM ID 0305 | PROGRAM ID 0408 | PROGRAM ID 0504 | PROGRAM ID 0606 | PROGRAM ID 0707 | PROGRAM ID 0808 |
| 16 | PROGRAM ID 0008 | PROGRAM ID 0108 | | PROGRAM ID 0306 | PROGRAM ID 0409 | | PROGRAM ID 0607 | | PROGRAM ID 0809 |
| 17 | | | | | PROGRAM ID 0410 | PROGRAM ID 0505 | | PROGRAM ID 0708 | PROGRAM ID 0810 |

PROGRAM SCHEDULE INDIVIDUAL DATA GENERATION REGION (TIME)

180

PROGRAM SCHEDULE GENERATING DEVICE AND PROGRAM SCHEDULE GENERATING METHOD

FIELD OF THE INVENTION

The present invention relates to a program schedule generating device and a program schedule generating method.

BACKGROUND ART

In digital broadcasting, each broadcast station can transmit program data on its broadcast signal, so receiving devices generally have a function for displaying the program schedule of each broadcast station as an electronic program guide on a television screen or the like.

An electronic program guide can be used to display, in addition to an electronic program schedule, the title and air time of the currently tuned program, summaries of programs and their performers, program reservations, and so on. In particular, an electronic program schedule enables the program information for multiple broadcast stations in a desired time slot to be displayed, which is useful in checking broadcast schedules and searching for programs.

A technique for preventing user operations on an electronic program schedule from being interrupted by update of the electronic program schedule is disclosed in Patent Reference 1. The electronic program schedule generating device disclosed in Patent Reference 1 is configured so as not to execute update processing on the electronic program schedule while the user continues to operate on the electronic program schedule. Therefore, the technique disclosed in Patent Reference 1 can enhance operability by preventing user operations from being temporarily interrupted by electronic program schedule update processing.

PRIOR ART REFERENCES

Patent Documents

Patent Reference 1: Japanese Patent Application Publication No. 2007-28076 (paragraph 0019, FIG. 1)

SUMMARY OF THE INVENTION

Problem to be Solved by the Invention

With the technique described in Patent Reference 1, however, there is the possibility that if a program broadcast ends while the user is carrying out an operation on the electronic program schedule, the content of the currently displayed electronic program schedule may differ from the current broadcast program content.

Furthermore, the time slots or broadcast stations displayed on an electronic program schedule can generally be changed by scrolling the displayed content with key operations or the like. However, since an electronic program schedule has a large amount of information to display, changing the display screen by generating screen data from scratch requires much time. Accordingly, a user who, for example, makes a mistake in a key operation and must perform the key operation again after the display screen has changed experiences much stress on account of the slow response of the display.

It is therefore an object of the present invention to reduce the processing load and processing time associated with electronic program schedules, thereby enabling the more responsive display of electronic program schedules.

Means for Solving the Problem

A program schedule generating device according to an embodiment of the invention includes: a video memory for storing raw material data that are vector data for image rendering; a program information storing unit for storing program data generating information including display information to be displayed for each program in a program schedule; a program schedule individual data generating unit for generating program schedule individual data for each program, including graphic rendering definitions for using the raw material data to form an image indicating the display information, and raw material data reference information indicating storage locations, in the video memory, of the raw material data used in the graphic rendering definitions; a program schedule display list generating unit for generating a program schedule display list indicating, for each of the program schedule individual data, a position at which to place the image rendered on a basis of the program schedule individual data; and a rendering unit for rendering the image for each program by use of the raw material data on the basis of the program schedule individual data and placing the rendered image on a basis of the program schedule display list, thereby generating screen data for a program schedule screen.

Effects of the Invention

According to an embodiment of the invention, the processing load and processing time associated with electronic program schedules can be reduced, so electronic program schedules can be displayed more responsively.

BRIEF DESCRIPTION OF THE DRAWINGS

FIG. 2 is a schematic diagram showing an exemplary raw material data expansion table.

FIG. 3 is a schematic diagram showing an exemplary font table.

FIG. 4 is a schematic diagram showing exemplary program schedule related information.

FIG. 5 is a schematic diagram showing exemplary program schedule individual data.

FIG. 7 is a schematic diagram showing an exemplary program schedule.

MODE FOR CARRYING OUT THE INVENTION

Figure 1:
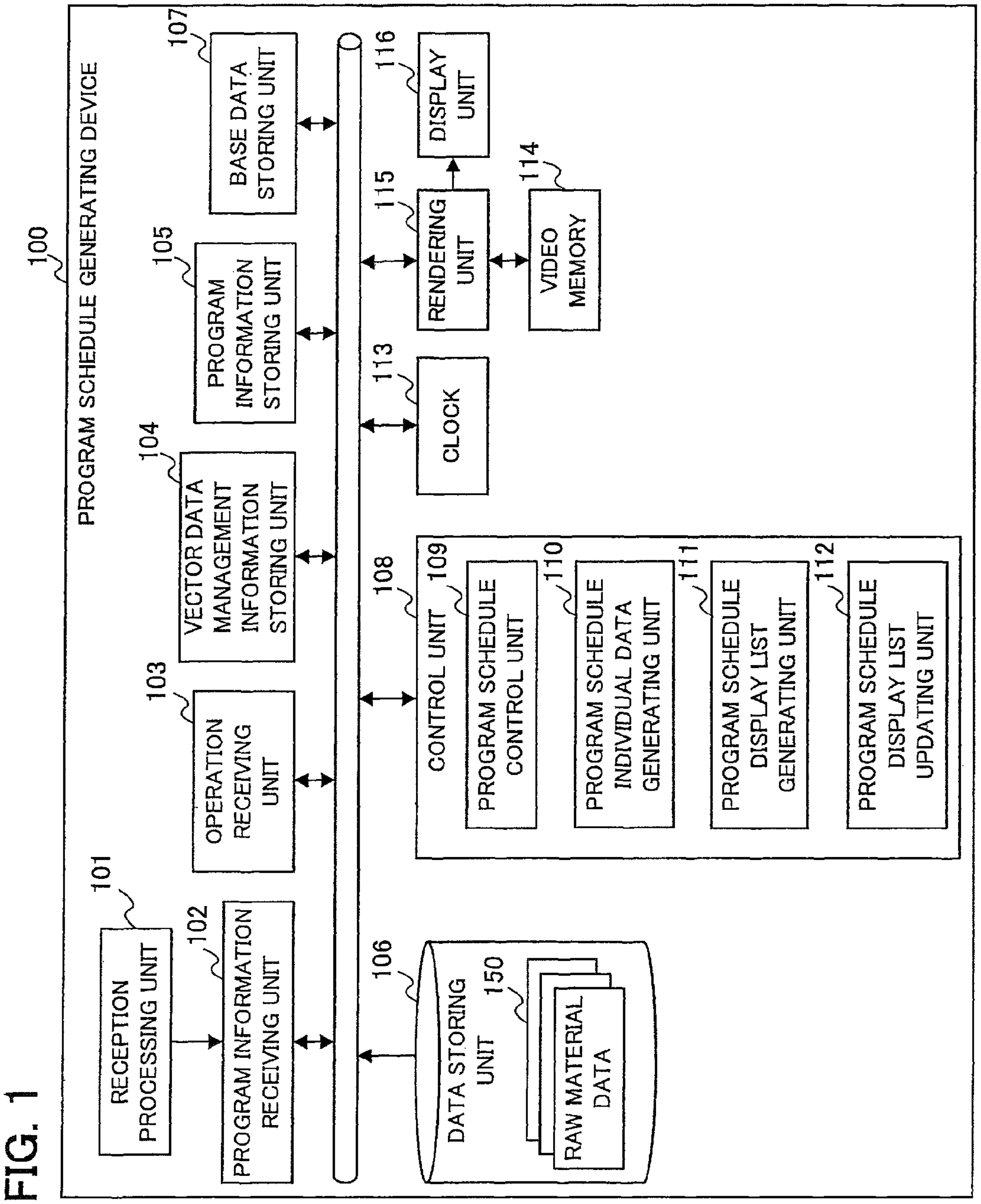
FIG. 1 is a block diagram showing the schematic configuration of a program schedule generating device.

FIG. 1 is a block diagram showing the schematic configuration of a program schedule generating device 100 in an embodiment. The program schedule generating device 100 includes a reception processing unit 101, a program information receiving unit 102, an operation receiving unit 103, a vector data management information storing unit 104, a program information storing unit 105, a data storing unit 106, a base data storing unit 107, a control unit 108, a clock 113, a video memory 114, a rendering unit 115, and a display unit 116. The reception processing unit 101 and program information receiving unit 102 constitute a program information acquisition unit.

The reception processing unit 101 generates a TS (Transport Stream) as a digital signal from a radio signal received by an antenna, not shown in the drawings, and separates SI (Service Information), which is program table information, from the TS. Then the reception processing unit 101 sends the separated SI to the program information receiving unit 102. Here, for example, the TS generated by the reception processing unit 101 is an MPEG-2 (Moving Picture Experts Group 2) TS.

The program information receiving unit 102 acquires program information necessary to configure a program schedule from the SI. The program information includes information related to programs to be broadcast. The program information receiving unit 102 sends the acquired program information to the control unit 108. Here, in this embodiment, the program information includes at least a TOT (Time Offset Table), an EIT_p/f (Event Information Table present/following), and an EIT_s (Event Information Table schedule). The TOT includes information regarding the current time and date and information indicating offset times for daylight saving time implementation. From among the information in the EIT (Event Information Table), which gives program names, broadcast dates and times, program content, and other program related information, the EIT_p/f includes information indicating the current programs (present) and the next programs (following). The EIT_s is schedule information in the EIT; it includes, for example, an eight-day program schedule.

The operation receiving unit 103 accepts input from user operations. The operation receiving unit 103 can be implemented by, for example, a key input device (a keyboard, a touch panel, a remote control, etc.), a pointing device (a mouse, etc.), or an interface having functions for communicating with an external device. The operation receiving unit 103 then notifies the control unit 108 of the user operation information of which it has accepted input.

The vector data management information storing unit 104 stores a raw material data expansion table 120 indicating relationships between raw material vector data and addresses on the video memory 114 when the raw material vector data are expanded onto the video memory 114 and, when the raw material data are font data, a font table 121 indicating relationships between character codes in the font data and the addresses at which the glyph data of the character codes are stored in the font data.

FIG. 2 is a schematic diagram showing an exemplary raw material data expansion table 120. As shown, the raw material data expansion table 120 includes a raw material type field 120*a*, a registration name field 120*b*, and an expansion address field 120*c*.

The raw material type field 120*c* stores the raw material type, which is raw material identification information indicating whether the raw material data 150, which are vector data, are font data, or path data other than font data.

The registration name field 120*b* stores registration names, which are indexes unique to the raw material data 150 to be expanded onto the video memory 114.

The expansion address field 120*c* stores expansion addresses at which the raw material data 150 identified in the registration name field 120*b* are expanded onto the video memory 114.

When program schedule individual data 160 are generated as described later, the above indexes identify the addresses on the video memory 114 of the vector data (raw material data 150) used in rendering.

The example in FIG. 2 indicates that raw material A is raw material of the font data type, and that the vector data are registered with index 'Font_001' and expanded at address '0x06000000' and addresses thereafter on the video memory 114. This example also indicates that raw material B is raw material of the path data type, and that the vector data are registered with index 'Path_001' and expanded at address '0x07000000' and addresses thereafter.

FIG. 3 is a schematic diagram showing an exemplary font table 130. As shown, the font table 130 includes a font ID field 130*a*, a character code field 130*b*, a reference address field 130*c*, and a size field 130*d*.

The font ID field 130*a* stores font IDs, which are font identification information for identifying font data. A font ID gives a three-digit number included in the index (registration name) of the font data registered in the raw material data expansion table 120.

The character code field 130*b* stores character codes, which are character identification information for identifying the characters included in the font data designated in the font ID field 130*a*.

The reference address field 130*c* stores reference addresses indicating the addresses on the font data at which the glyph data of the characters indicated by the character codes designated in the character code field 130*b* are stored.

The size field 130*d* stores the data size of the glyph data indicated by the character codes designated in the character code field 130*b*.

The example in FIG. 3 indicates that the hiragana character 'o' with character code '304A' included in the font data 'Font_003' identified by font ID '003' has glyph data with a size of '512' bytes at font data address '0x000F4E20'. Similarly, the hiragana character 'ga' with character code '304C' has glyph data with a size of '462' bytes at font data address '0x000F51B0'.

Returning to the description of FIG. 1, the program information storing unit 105 stores program schedule related information 140 including program data generating information which indicates the latest program information obtained from the program information receiving unit 102 and generation or non-generation of the program schedule individual data 160 for each program, and the display reference position of the program schedule. FIG. 4 is a schematic diagram showing exemplary program schedule related information 140. As illustrated, the program schedule related information 140 includes program data generating information including a program ID, broadcast station ID, broadcast station name, start time, end time, genre, title, program summary, and data address, and a display reference position including a broadcast station ID and time.

The program ID is an index assigned to each program.

The broadcast station ID is an index assigned to the broadcast station that broadcasts the program identified by the program ID.

The broadcast station name is the name of the broadcast station that broadcasts the program identified by the program ID.

The start time is the starting time of the program identified by the program ID.

The end time is the ending time of the program identified by the program ID.

Here, the start time and end time define the airtime of the program identified by the program ID.

The genre is category information for the program identified by the program ID, indicating a category such as movie, sports, or news, for example.

The title is the name of the program identified by the program ID.

The program summary is information that indicates the content of the program identified by the program ID. The program summary includes performers etc. in the program identified by the program ID.

The above information, from the program ID to the program summary, is extracted from the program information sent from the program information receiving unit 102, and is stored in the program data generating information for each program. Since a program schedule displays titles and program summaries, the titles and program summaries constitute the display information.

The data address represents the address on the video memory 114 when the program schedule individual data 160 corresponding to the program identified by the program ID are stored on the video memory 114 as described later.

The display reference position indicates a broadcast station and time that are used as a reference for display of the program schedule. The display reference position is, for example, information that indicates the upper left display starting position in the actually displayed screen display region in the program schedule. In this embodiment, the display starting position of the screen display region is indicated by a broadcast station ID and time.

Returning to the description of FIG. 1, the data storing unit 106 stores multiple items of raw material data 150 for generating images of the component parts that constitute the screen data of the program schedule screen. The raw material data 150 are, for example, vector data including vector graphics data for icon data and logo marks and vector font data (outline font data). It will be assumed that unique three-digit numbers are individually assigned to the graphics data and font data as data identification information.

The base data storing unit 107 stores generating rule information that indicates generating rules to be applied in generating the image for each program in a program schedule screen. The generating rule information includes, for example, information designating a background color for each genre in the image of each program, information designating font IDs and character sizes of characters used in the program schedule, information designating the placement of the channel corresponding to the broadcast station ID indicated by the display reference position, reference positional information indicating the reference position (e.g., x=260 pixels, y=260 pixels) of the screen display region, etc. The base data storing unit 107 also stores display parameters indicating the width per broadcast station and height per hour when images are generated for each program. The base data storing unit 107 further stores channel information indicating broadcast station IDs and, in association therewith, the channels used by the broadcast stations identified by the broadcast station IDs.

The control unit 108 exercises general control over the processing in the program schedule generating device 100. For example, the control unit 108 generates a display list and individual data for configuring the screen data of the program schedule screen, and updates the display list. Here, the control unit 108 includes a program schedule control unit 109, a program schedule individual data generating unit 110, a program schedule display list generating unit 111, and a program schedule display list updating unit 112.

The program schedule control unit 109 controls the overall program schedule display processing. For example, the program schedule control unit 109 notifies the rendering unit 115 of display instructions, thereby causing the display unit 116 to display a program schedule screen. The program schedule control unit 109 also notifies the rendering unit 115 of switchover instructions, thereby changing the screen displayed on the display unit 116. In addition, the program schedule control unit 109 executes processing corresponding to the content of operations accepted as input by the operation receiving unit 103.

To generate program schedule individual data 160 for each program, the program schedule individual data generating unit 110 uses the program schedule related information 140 stored in the program information storing unit 105 and the address information stored in the raw material data expansion table 120 stored in the vector data management information storing unit 104, giving the addresses of the raw material data 150 on the video memory 114. The program schedule individual data generating unit 110 stores the generated program schedule individual data 160 in the program schedule individual data area **114*e* in the video memory 114, as described later (see FIG. 9**).

FIG. 5 is a schematic diagram showing exemplary program schedule individual data 160. As shown in the diagram, the program schedule individual data 160 include first header information **160*a*, second header information 160*b*, graphic rendering definitions 160*c*, and a raw material data reference table 160*d***.

The first header information **160*a* indicates the offset address from the top of the program schedule individual data 160 to the top of the raw material data reference table 160*d***.

The second header information **160*b* indicates the offset address from the top of the program schedule individual data 160 to the top of the vector data area 114*f*, which will be described later (see FIG. 9), in the video memory 114**.

The graphic rendering definitions **160*c* represent rendering definitions for rendering an image for each program by use of the raw material data 150 constituting the program schedule individual data 160. The graphic rendering definitions 160*c* include, for example, placement information, ID information, depth information, transformation matrix information, and end-of-frame information. The placement information defines the placement, update, or deletion of the raw material data 150. The ID information defines the intended raw material data 150 by indexes. For example, 'ID=0' indicates the raw material data 150 stored at the first address in the raw material data reference table 160*d*. The depth information defines the order of overlap when images rendered with the raw material data 150 defined by the ID information are placed. The transformation matrix information defines parallel translation, enlargement, reduction, rotation, and color specifications for the placement or updating of images rendered with the raw material data 150** defined by the ID information. The end-of-frame information defines a change of frame.

The raw material data reference table **160*d* indicates the offset address from the top of the vector data area 114*f* (see FIG. 9) in the video memory 114 to the top of the intended raw material data 150 for each index of the raw material data 150 used in the graphic rendering definitions 160*c*. The offset addresses are listed sequentially in the raw material data reference table 160*d***, starting from index '0' (ID=0).

In the example in FIG. 5, the raw material data reference table **160*d* is located at address '0x00000140' from the top of the program schedule individual data 160, as indicated by the first header information 160***a*. The vector data area 114*f* in the video memory 114 is shown to be positioned at address '0x04000000' from the top of the program schedule individual data, as indicated by the second header information 160*b*. The program schedule individual data 160 are shown to be configured from multiple items of raw material data 150; the raw material data 150 with ID=1 are shown to be stored at address '0x00344E20' from the top of the vector data area 114*f* in the video memory 114, as indicated on the second line in the raw material data reference table 160*d*. The raw material data with ID=2 are shown to be stored address '0x00348086' from the top of the vector data area 114*f*, as indicated on the third line of the raw material data reference table 160*d*, and the image of the raw material data 150 with ID=2 is rendered at a position translated by 30 pixels in the X-direction from the image of the raw material data with ID=1.

Returning to the description of FIG. 1, the program schedule display list generating unit 111 generates program schedule display lists 170 indicating the placement positions and display positions of the images rendered by use of the program schedule individual data 160 generated by the program schedule individual data generating unit 110, and stores the program schedule display lists 170 in the video memory 114.

Figure 6:
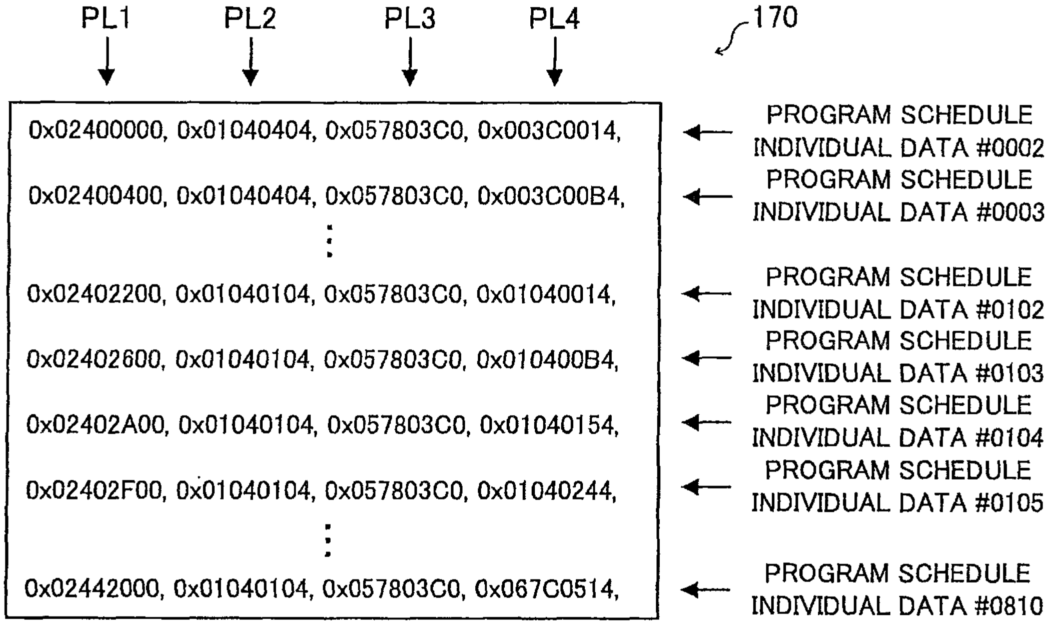
FIG. 6 is a schematic diagram showing an example of the data structure of a program schedule list.

FIG. 6 is a schematic diagram showing an example of the data structure of a program schedule display list 170. As shown, the program schedule display list 170 gives a structural definition for each item of the program schedule individual data 160, for use in configuring the program schedule screen by combining the images rendered on the basis of the program schedule individual data 160. In the program schedule display list 170 there are four parameters: PL1, PL2, PL3, and PL4.

Parameter PL1 indicates the address on the video memory 114 at which corresponding program schedule individual data 160 are stored.

Parameter PL2 indicates the reference coordinates of the screen display region, which is the effective display region in which the corresponding program schedule individual data 160 are displayed on the program schedule screen.

Parameter PL3 indicates the width and height of the screen display region when the corresponding program schedule individual data 160 are displayed on the program schedule screen.

Parameter PL4 indicates the reference coordinates when the image of the corresponding program schedule individual data 160 is rendered. The program schedule display list 170 designates a PL4 value here for each item of program schedule individual data 160, so that the image for the program broadcast at the time and with the broadcast station ID indicated by the display reference position is displayed at the reference coordinates of the screen display region.

FIG. 7 is a schematic diagram showing an exemplary program schedule 180 based on the program schedule display list 170 in FIG. 6. As shown in the diagram, the program schedule 180 is configured from a combination of single-program images rendered on the basis of program schedule individual data 160 for nine channels (horizontal) and nine hours (vertical).

Figure 8:
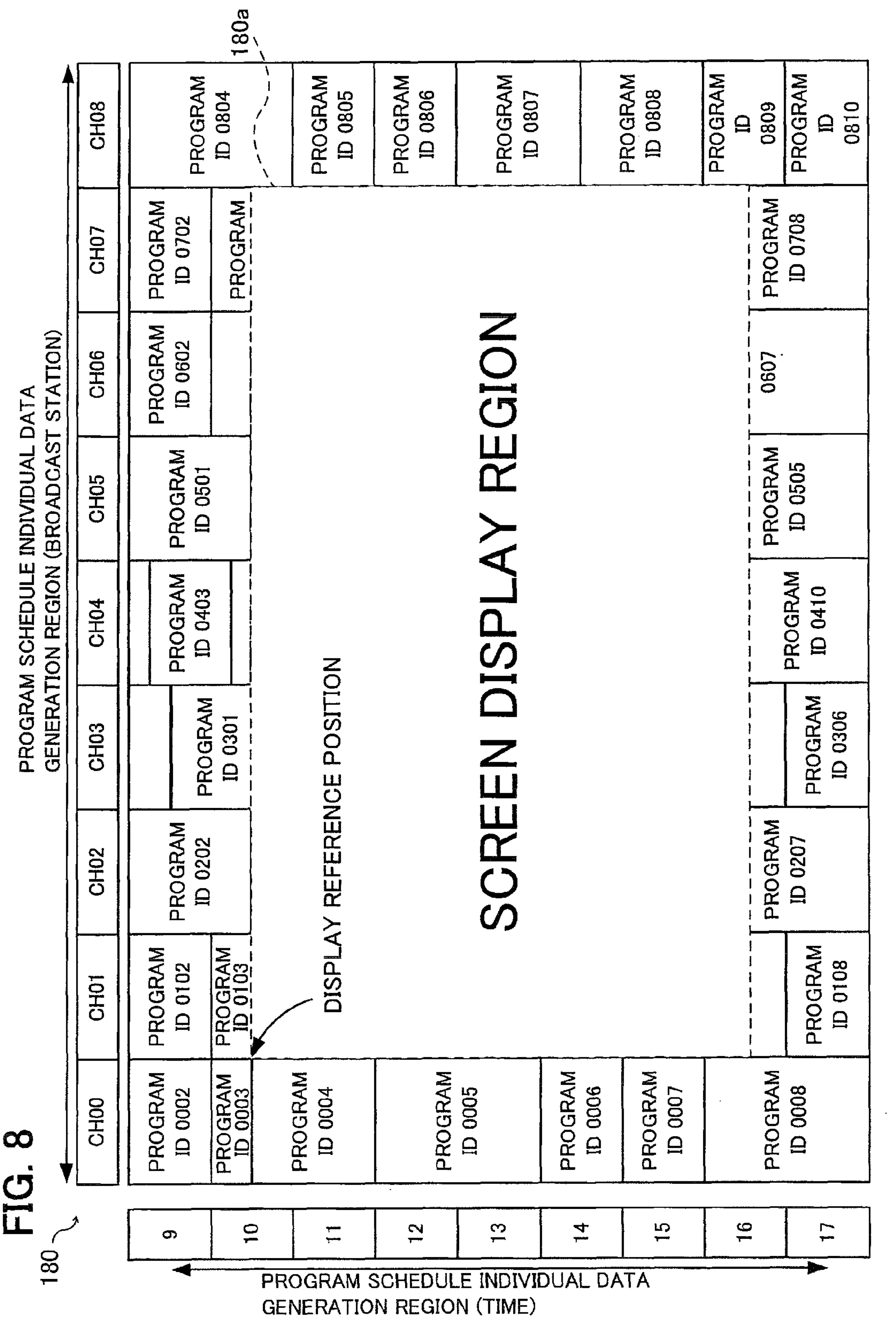
FIG. 8 is a schematic diagram showing an exemplary screen display region in the program schedule.

FIG. 8 is a schematic diagram showing an exemplary screen display region 180*a* in the program schedule 180 based on the program schedule display list 170 shown in FIG. 6. As illustrated, in the program schedule 180 structured horizontally for nine channels and vertically for nine hours on the basis of the program schedule individual data 160 and program schedule display list 170, the rendering unit 115 renders images in a screen display region 180*a* extending for seven channels horizontally and six hours vertically. In other words, the screen display region 180*a* is the program schedule screen displayed on the display unit 116.

In the example in FIG. 6, from parameter PL1, the program schedule individual data #0002 defined on the first line are stored at address '0x02400000' on the video memory 114; from parameters PL2 and PL3, the screen display region 180*a* displayed as a program schedule screen has reference coordinates (X, Y)=(260, 260) and (width, height)=(1400, 960). From parameter PL4, the reference coordinates at which the image based on program schedule individual data #0002 is placed are (X, Y)=(60, 20). Accordingly, since the one-program image based on program schedule individual data #0002 is not included in the screen display region 180*a*, the rendering unit 115 does not perform any rendering on the basis of program schedule individual data #0002.

Similarly, from parameter PL1, the program schedule individual data #0102 defined on the fourth line are stored at address '0x02402200' on the video memory 114; from parameters PL2 and PL3, the screen display region 180*a* displayed as a program schedule screen has reference coordinates (X, Y)=(260, 260) and (width, height)=(1400, 960). From parameter PL4, the reference coordinates at which the image based on program schedule individual data #0002 is placed are (X, Y)=(260, 20) and it is not included in the screen display region 180*a*. The rendering unit 115 does not perform any rendering on the basis of program schedule individual data #0102.

In contrast, from parameter PL1, the program schedule individual data #0103 defined on the fifth line are stored at address '0x02402600' on the video memory 114; from parameters PL2 and PL3, the screen display region 180*a* displayed as a program schedule screen has reference coordinates (X, Y)=(260, 260) and (width, height)=(1400, 960). From parameter PL4, the reference coordinates at which the image based on program schedule individual data #0103 is placed are (X, Y)=(260, 180). Accordingly, the rendering unit 115 performs rendering on the basis of program schedule individual data #0103, but only the lower half (corresponding to the time from 10:30 to 11:00) is displayed on the program schedule screen.

Similarly, from parameter PL1, the program schedule individual data #0104 defined on the sixth line are stored at address '0x02402A00' on the video memory 114; from parameters PL2 and PL3, the screen display region 180*a* displayed as a program schedule screen has reference coordinates (X, Y)=(260, 260) and (width, height)=(1400, 960). From parameter PL4, the reference coordinates at which the image based on program schedule individual data #0104 is placed are (X, Y)=(260, 340). Accordingly, the rendering unit 115 performs rendering on the basis of program schedule individual data #0103, and the entire rendered image is displayed on the program schedule screen.

Returning to the description of FIG. 1, the program schedule display list updating unit 112 updates the parameters of the program schedule display lists 170 stored on the video memory 114, on the basis of the content of operations from the operation receiving unit 103.

The clock 113 keeps time. This embodiment assumes that the time kept by the clock 113 is the current time.

The video memory 114 stores the vector data constituting the raw material data 150, the program schedule individual data 160 generated in the program schedule individual data generating unit 110, the program schedule display lists 170 generated by the program schedule display list generating unit 111, and other data.

Figure 9:
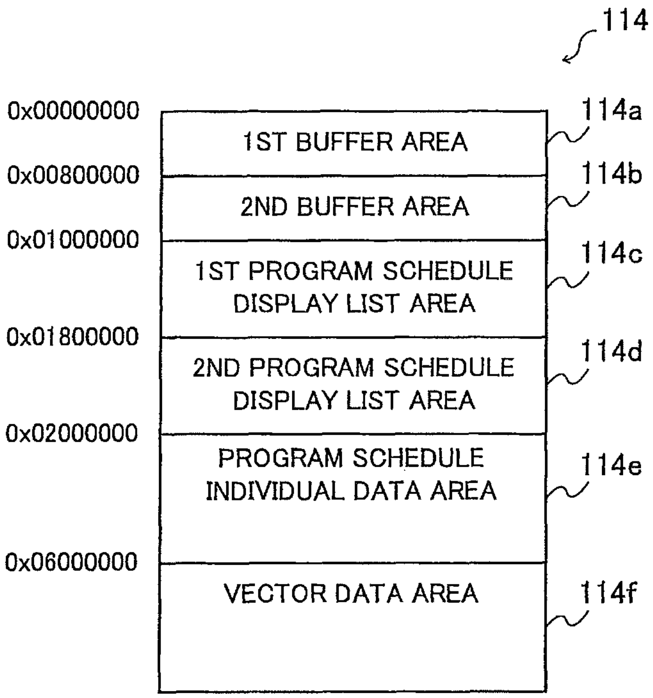
FIG. 9 is a schematic diagram showing an exemplary video memory structure.

FIG. 9 is a schematic diagram showing an example of the structure of the video memory 114. As shown, the video memory 114 includes a first frame buffer area 114*a*, a second frame buffer area 114*b*, a first program schedule display list area 114*c*, a second program schedule display list area 114*d*, a program schedule individual data area 114*e*, and a vector data area 114*f*.

The first frame buffer area 114*a* and second frame buffer area 114*b* store the frame data of the program schedule screen rendered by the rendering unit 115. Here, the first frame buffer area 114*a* and second frame buffer area 114*b* store the frame data alternately. For example, when the first frame buffer area 114*a* stores the frame data of the currently displayed program schedule screen, the second frame buffer area 114*b* stores the frame data of the program schedule screen to be displayed next.

The first program schedule display list area 114*c* and second program schedule display list area 114*d* store program schedule display lists 170 generated by the program schedule display list generating unit 111. Here, the first program schedule display list area 114*c* and second program schedule display list area 114*d* store the program schedule display lists 170 alternately. For example, when the first program schedule display list area 114*c* stores the program schedule display list 170 corresponding to the currently displayed program schedule screen, the second program schedule display list area 114*d* stores a program schedule display list 170 that was updated in the program schedule display list updating unit 112.

The program schedule individual data area 114*e* stores the program schedule individual data 160 generated in the program schedule individual data generating unit 110.

The vector data area 114*f* stores raw material data 150 stored in the data storing unit 106.

Returning to the description of FIG. 1, the rendering unit 115 is a graphics engine for processing vector data, and operates by receives instructions from the control unit 108. For example, when the rendering unit 115 receives a display instruction or a switch-over instruction from the program schedule control unit 109 in the control unit 108, it decodes the vector data defined by the program schedule individual data 160 stored in the video memory 114 on the basis of a program schedule display list 170, stored in the video memory 114, that is designated by the program schedule control unit 109, thereby rendering images, and combines the images, thereby generating the image data of the program schedule screen. Then the rendering unit 115 sends the generated image data to the display unit 116.

Based on the image data acquired from the rendering unit 115, the display unit 116 displays the screen.

The control unit 108, vector data management information storing unit 104, program information storing unit 105, base data storing unit 107, and rendering unit 115 may be configured from an integrated circuit including, for example, a CPU or other microprocessor, ROM (Read Only Memory), RAM (Random Access Memory), a timer circuit, an input/output interface, and special processing units. Some or all of the functions of the control unit 108, vector data management information storing unit 104, program information storing unit 105, base data storing unit 107, and rendering unit 115 may be implemented either by hardware or by having a microprocessor execute prescribed computer programs. Furthermore, when some or all of the functions of the control unit 108, vector data management information storing unit 104, base data storing unit 107, and rendering unit 115 are implemented by computer programs (including executable files), the microprocessor can load computer programs or corresponding executable files from a computer-readable recording medium and execute them to implement the functions. The data storing unit 106 can be implemented by use of a storage device, such as a nonvolatile memory, an HDD (hard disc drive), or a read-write device equipped with an optical disc.

The operation of the program schedule generating device 100 with the above configuration will now be described.

Figure 10:
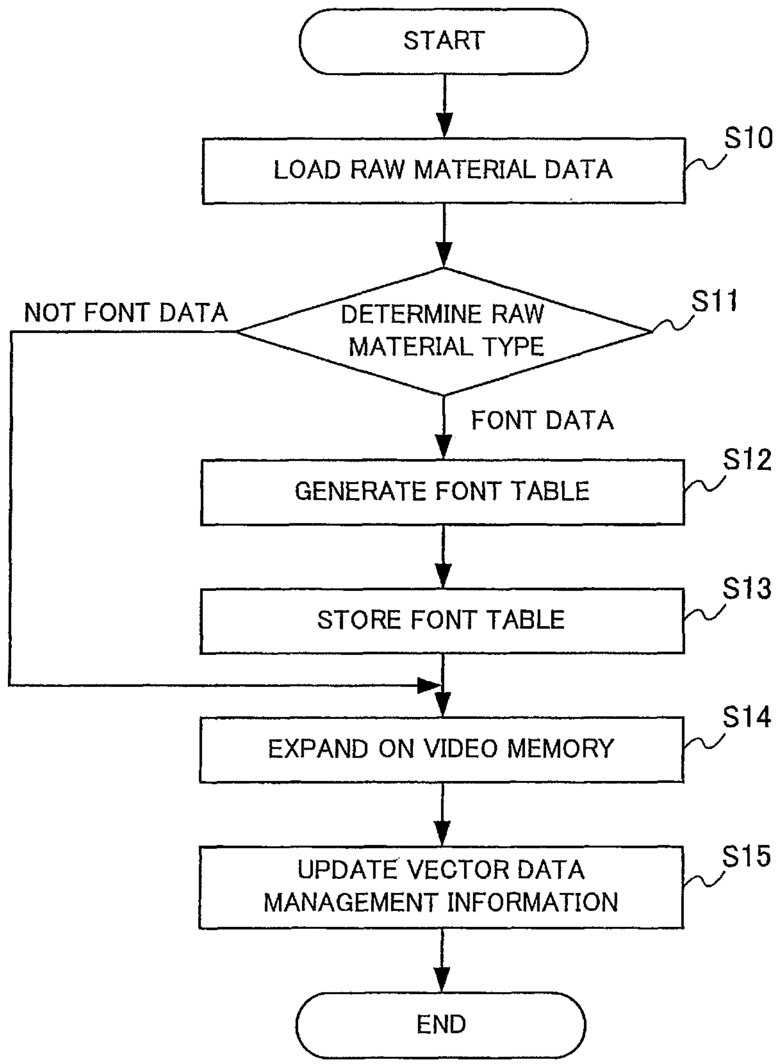
FIG. 10 a flowchart schematically illustrating an initial process of the program schedule generating device.

FIG. 10 is a flowchart schematically illustrating the initial processing by the program schedule generating device 100. The control unit 108 of the program schedule generating device 100 initiates the flow in FIG. 10 at startup, for example, or at other times.

First the program schedule control unit 109 loads the raw material data 150 stored in the data storing unit 106 (S10).

Then the program schedule control unit 109 determines the raw material types of the loaded raw material data 150 (S11). When the result of the determination is font data, the program schedule control unit 109 proceeds to the processing in step S12; when the result of the determination is not font data, it proceeds to the processing in step S14. Here, the program schedule control unit 109 may perform this determination according to a file extension. The raw material data 150 may be stored in different folders in the data storing unit 106, classified according to raw material type.

In step S12, the program schedule control unit 109 generates font IDs from the data identification information assigned to the font data, refers to the raw material data 150 that are font data, thereby obtains the address, in the font data, and size of the glyph data corresponding to each character code, and stores this information in the corresponding fields to generate the font table 130 (see FIG. 3).

Next, the program schedule control unit 109 stores the font table 130 generated in step S12 in the vector data management information storing unit 104 (S13).

In step S14, the program schedule control unit 109 writes the raw material data 150 loaded in step S10 into the vector data area 114*f* (see FIG. 9) in the video memory 114.

Next, the program schedule control unit 109 stores information for the raw material data 150 written into the video memory 114 in the raw material data expansion table 120 stored in the vector data management information storing unit 104, thereby updating the raw material data expansion table 120 (S15). Among the raw material data 150 that were loaded in step S10, for the data that were determined to be font data in step S11, for example, the program schedule control unit 109 generates a registration name (index) by assigning '01' as the raw material type and adding 'Font_' at the head of the data identifier assigned to the raw material data 150 as its registration name. Among the raw material data 150 that were loaded in step S10, for the data that were not determined to be font data in step S11, it assigns '02' as the raw material type, and as the registration name, it generates a registration name (index) by adding 'Path_' at the head of the data identifier preassigned to the raw material data 150. Then the program schedule control unit 109 stores the above information and the addresses at which individual raw material data 150 are stored in the video memory 114 in the corresponding fields in the raw material data expansion table 120.

Figure 11:
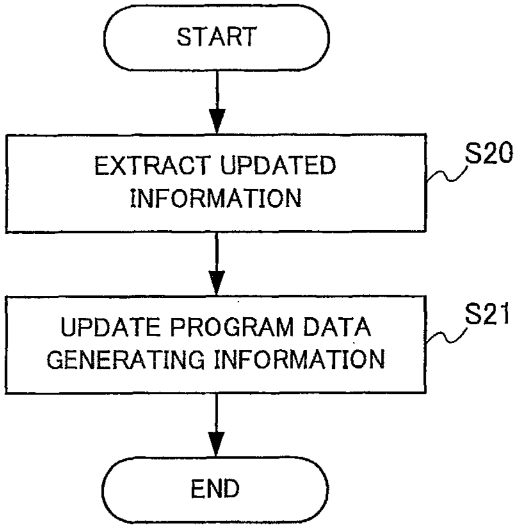
FIG. 11 is a flowchart schematically illustrating a process when program information is updated by the program schedule generating device.

FIG. 11 is a flowchart schematically illustrating the processing when the program information is updated in the program schedule generating device 100. The control unit 108 initiates the flow in FIG. 11 when it receives program information from the program information receiving unit 102.

First, the program schedule control unit 109 compares the content of the program information reported by the program information receiving unit 102 and the content of the program data generating information in the program schedule related information 140 stored in the program information storing unit 105, and extracts updated information for programs that have ended or been added or altered (S20).

Next, the program schedule control unit 109 updates the program data generating information in the program schedule related information 140 to reflect the content of the updated information (S21). For an added or altered program, the data address, which is an element of the program data generating information, is here initialized to '0xFFFFFFFF'.

Figure 12:
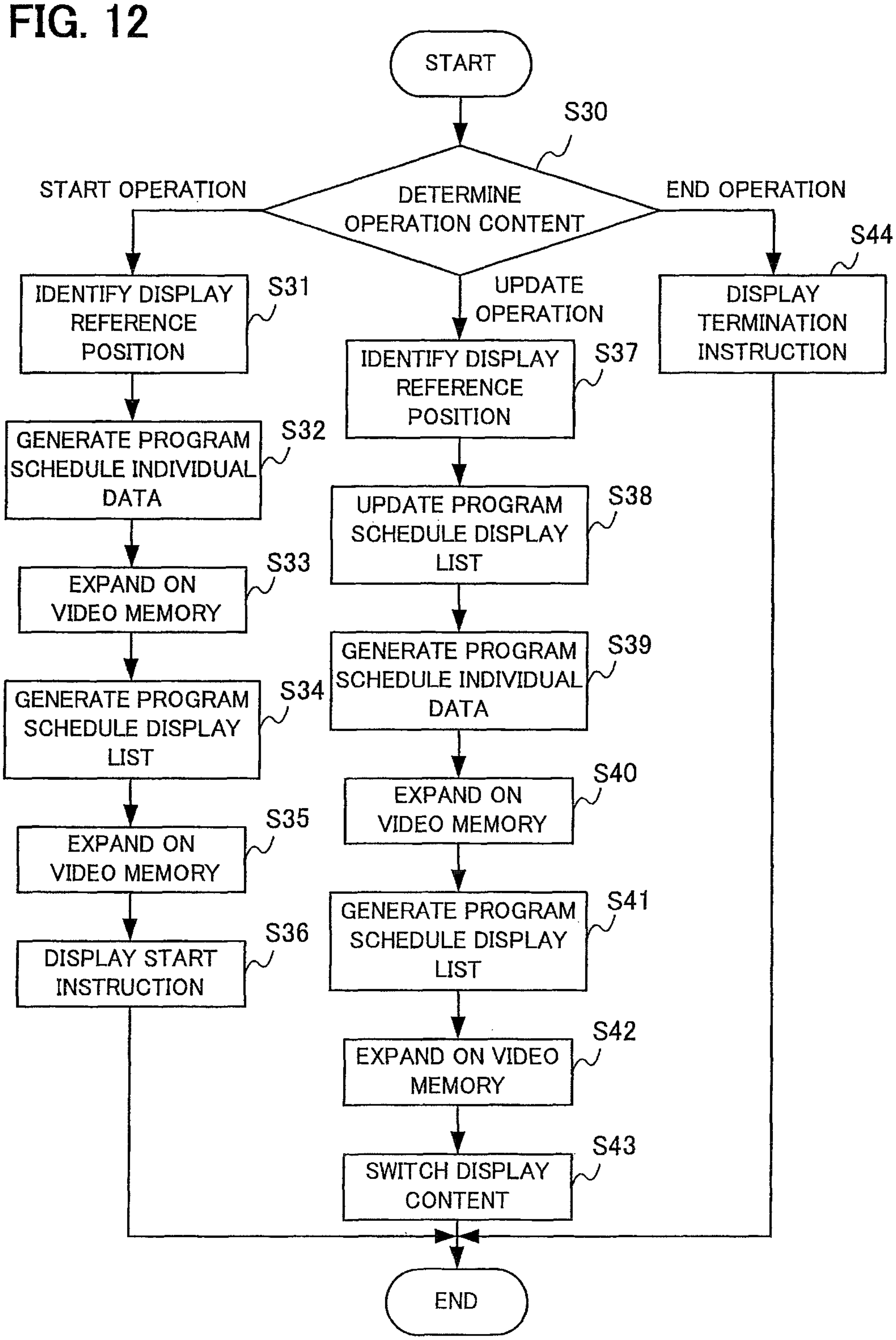
FIG. 12 is a flowchart schematically illustrating a process in the program schedule generating device when a user operation is performed.

FIG. 12 is a flowchart schematically illustrating the processing carried out in the program schedule generating device 100 when a user operation is performed. The control unit 108 initiates the flowchart in FIG. 12 when it receives the content of the operation from the operation receiving unit 103.

First, the program schedule control unit 109 in the control unit 108 determines the content of the user operation reported by the operation receiving unit 103 (S30). Then, if the operation content is determined to indicate that display of the program schedule is to start, the program schedule control unit 109 proceeds to the processing in step S31; if the operation content is determined to indicate an update of the displayed content of the program schedule, such as a scroll operation, the program schedule control unit 109 proceeds to the processing in step S37; if the operation content is determined to indicate that display of the program schedule is to end, it proceeds to the processing in step S44.

In step S31, the program schedule control unit 109 reads the display reference position at which to display the program schedule from the program schedule related information 140 stored in the program information storing unit 105. Then, if the time included in the display reference position that is read is previous to the current time kept by the clock 113, the program schedule control unit 109 updates the time included in the display reference position to the current time. For example, if the broadcast station ID at the display reference position that was read is 'CH01', the time is 'August 7 10:30', and the current time given by the clock is 'August 8 10:23', the program schedule control unit 109 updates the time included in the display reference position to 'August 8 10:30', so that the program currently being broadcast is displayed at the display reference position. In this way, the program schedule control unit 109 determines the display reference position based on which the program schedule will be displayed.

The program schedule individual data generating unit 110 then identifies relevant programs from the program schedule related information 140 stored in the program information storing unit 105, on the basis of the display reference position identified in step S31, and generates the program schedule individual data 160 on the basis of the program data generating information of the identified programs (S32). If the broadcast station ID and time at the identified display reference position are 'CH01' and 'August 8 10:30', the number of broadcast stations displayed on one screen is '7' and the time displayed on one screen is '6 hours', for example, then the relevant programs for which program schedule individual data 160 are generated are the programs broadcast by broadcast stations 'CH00' to 'CH08' from 'August 8 9:30' to 'August 8 17:30'. In other words, program schedule individual data 160 are generated for the programs broadcast on the channels in a given span of channels preceding and following the channel indicated by the broadcast station ID at the display reference position and in a given span of time preceding and following the time at the display reference position.

The program schedule individual data generating unit 110 determines the display regions of the programs from the program schedule individual data 160 for the relevant programs, the width per broadcast station and height per hour as the display parameters stored in the base data storing unit 107, and the start and end times in the program data generating information included in the program schedule related information 140. Then the program schedule individual data generating unit 110 identifies the background colors in the display regions according to the genres indicated by the program data generating information, by referring to the generating rule information stored in the base data storing unit 107. The program schedule individual data generating unit 110 also refers to the generating rule information stored in the base data storing unit 107 to identify the fonts used to display the titles and summaries of the programs. Then The program schedule individual data generating unit 110 creates a graphic rendering definition 160*c* for each character or graphics data item according to the identified display regions, background colors, and fonts for the background, titles, and summaries of the programs. The program schedule individual data generating unit 110 also generates a raw material data reference table 160*d* by identifying the addresses of the applicable raw material data 150 in the vector data area 114*f* of the video memory 114 from the raw material data expansion table 120 and font table 130 in the vector data management information storing unit 104.

Specifically, the program schedule individual data generating unit 110 places rectangular data with graphic rendering definition ID=0 and depth=0, and uses a matrix transformation to specify horizontal and vertical enlargement and reduction in order to obtain a size fitting the display region of the program, and a color to provide a background color appropriate for the program genre. Then the program schedule individual data generating unit 110 stores, in the raw material data reference table 160*d*, an offset address, from the top of the vector data area 114*f* on the video memory 114, at which the rectangular data are stored.

Next, if the title begins with the hiragana character 'o' with font ID=003, the program schedule individual data generating unit 110 places the character 'o' in the font with ID=003 in a graphic rendering definition, setting ID=1 and depth=1.

Then the program schedule individual data generating unit 110 calculates the an offset address, from the top of the vector data area 114*f* on the video memory 114, at which the character 'o' in the font with ID=003 is stored and stores the calculated offset address in the raw material data reference table 160*d*. For example, from the raw material data expansion table 120 stored in the vector data management information storing unit 104, it can be seen that the font data with font ID=003 (Font_003) are expanded at '0x06250000' on the video memory 114. From the font table 130 stored in the vector data management information storing unit 104, it can be seen that the character 'o' with the font ID=003 is located at address '0x000F4E20' in the font data. Accordingly, the program schedule individual data generating unit 110 adds the address '0x000F4E20' of 'o' in the font data to the address '0x06250000' of the font data on the video memory 114, thereby calculating the address '0x06344E20' of 'o' on the video memory 114. Consequently, the offset address from the top address '0x06000000' of the vector data area 114*f* is '0x00344E20'.

Similarly, if the next data of the title is the hiragana character 'ha' with the font ID=003, the program schedule individual data generating unit 110 places the character 'ha' in the font with ID=003 in a graphic rendering definition with a displacement of 30 pixels in the X direction, setting ID=2 and depth=2.

Then, the program schedule individual data generating unit 110 calculates an offset address, from the top of the vector data area 114*f* on the video memory 114, at which the character 'ha' with the font ID=003 is stored and stores the calculated offset address in the raw material data reference table 160*d*. For example, from the raw material data expansion table 120 stored in the vector data management information storing unit 104, it can be seen that the font data with font ID=003 (Font_003) are expanded at '0x06250000' on the video memory 114. From the font table 130 stored in the vector data management information storing unit 104, it can be seen that the character 'ha' with the font ID=003 is located at address '0x000F8086' in the font data. Accordingly, the program schedule individual data generating unit 110 adds '0x000F8086' to '0x06250000', thereby calculating the address '0x06348086' of 'ha' on the video memory 114. Consequently, the offset address from the top address '0x06000000' of the vector data area 114*f* is '0x00348086'.

If the address in the program schedule individual data area 114*e* of the video memory 114 storing the program schedule individual data 160 is '0x02000000', the second header information 160*b* in the program schedule individual data 160 is the difference from the top address '0x06000000' of the vector data area 114*f*, which is '0x04000000'.

Then the program schedule individual data generating unit 110 performs similar processing on the raw material data 150 which can be placed in the display region of the program, and after the size of the graphic rendering definitions 160*c* is determined, it generates an offset address from the head of the program schedule individual data 160 to the head of the raw material data reference table 160*d* and stores the generated offset address in the first header information 160*a*.

Next, the program schedule individual data generating unit 110 stores the generated program schedule individual data 160 in the program schedule individual data area 114*e* on the video memory 114 and writes the address information at the data address of the corresponding program ID in the program data generating information included in the program schedule related information 140 stored in the program information storing unit 105 (S33).

Next, the program schedule display list generating unit 111 uses the program schedule individual data 160 generated in step S32 to generate the program schedule display list 170 (S34). In this step, the program schedule display list generating unit 111 refers to the generating rule information stored in the base data storing unit 107 to determine the placement of the channels and the position of the screen display region. By generating program schedule individual data 160 for the programs surrounding the screen display region 180*a*, such as the programs for one broadcast station on both the right and left sides in the X direction and for one hour both above and below in the Y direction, and adding them to the program schedule display list 170 in step S32, it becomes possible, when the user operation content is an update operation, to update the content of the program schedule displayed on the display unit 116 just by updating the content of the program schedule display list 170.

Next, the program schedule display list generating unit 111 stores the generated program schedule display list 170 in the first program schedule display list area 114*c* or the second program schedule display list area 114*d* on the video memory 114, whichever has free space (S35).

The program schedule control unit 109 then issues a display start instruction to the rendering unit 115 on the basis of the program schedule display list 170 stored in step S35 (S36). On the basis of the display start instruction from the control unit 108, the rendering unit 115 decodes the raw material data 150 defined by the program schedule individual data on the basis of the specified program schedule display list 170 and combines the images, thereby generating the screen data of the program schedule screen.

If the operation content indicates an update operation (S30), however, the program schedule control unit 109 proceeds to the processing in step S37.

In step S37, the program schedule control unit 109 reads the display reference position for displaying the program schedule from the program schedule related information 140 stored in the program information storing unit 105, and updates the content of the display reference position according to the content of the user operation. If the user operation content is a displacement operation in the X direction, for example, it updates the broadcast station ID at the display reference position so as to indicate the broadcast station ID at the destination position of the displacement indicated by the operation; if the user operation is a displacement operation in the Y direction, it updates the time at the display reference position so as to indicate the time at the destination position of the displacement indicated by the operation.

Next, the program schedule individual data generating unit 110 updates the PL4 parameter values in the program schedule individual data 160 specified in the program schedule display list 170 on the basis of the updated display reference positions in the program information storing unit 105 (S38). In this example, the program schedule individual data generating unit 110 updates the PL4 values of all the program schedule individual data 160 so that the PL4 values of the program schedule individual data 160 of the program to be broadcast by the broadcast station indicated at the display reference position and at the time indicated at the display reference position are equal to the PL2 value. Here, since the rendering unit 115 decodes the raw material data 160 defined by the program schedule individual data 160 on the basis of the updated program schedule display list 170, the displayed content of the program schedule displayed on the display unit 116 is scrolled responsive to the displacement indicated by the user operation.

Then the program schedule individual data generating unit 110 generates program schedule individual data 160 for programs that have become newly relevant according to the updated display reference position in the program schedule related information 140 stored in the program information storing unit 105, on the basis of their program data generating information (S39).

Next, the program schedule individual data generating unit 110 stores the program schedule individual data 160 generated in step S39 in the program schedule individual data area 114*e* on the video memory 114 (S40). The program schedule individual data generating unit 110 writes address information for the program schedule individual data 160 stored in step S40 as the data addresses of the corresponding program IDs of the program data generating information. Conversely, regarding programs for which there is no longer need to generate program schedule individual data 160, the data addresses of the corresponding program IDs are initialized to '0xFFFFFFFF'. Here, in the program schedule individual data area 114*e* on the video memory 114, the program schedule individual data 160 of newly added programs may be stored in the area used for programs for which program schedule individual data 160 need no longer be generated, using a fixed data size for each program. The program schedule individual data generating unit 110 may also store the program schedule individual data 160 by using the program schedule individual data area 114*e* on the video memory 114 as a ring buffer.

Next, the program schedule display list generating unit 111 uses the display reference position updated in the program schedule related information 140 stored in the program information storing unit 105 and the program schedule individual data 160 generated in step S40 to generate a program schedule display list 170 (S41). The program schedule display list generating unit 111 then stores the generated program schedule display list 170 in whichever of the first program schedule display list area 114*c* and second program schedule display list area 114*d* on the video memory 114 is not currently being used (S42).

Then the program schedule control unit 109 gives the rendering unit 115 a switch-over instruction to decode the program schedule individual data 160 on the basis of the program schedule display list 170 stored in step S42 (S43). On the basis of the switch-over instruction from the control unit 108, the rendering unit 115 performs decoding based on the specified program schedule display list 170 and program schedule individual data 160, thereby rendering images and generating screen data for the program schedule screen.

Here, referring to FIG. 8, if the broadcast station and time spans for which program schedule individual data 160 are generated are sufficiently large in relation to the screen display region 180*a*, it is also possible to set respective broadcast station and time threshold values and omit the processing in step S41, step S42, and step S43 unless the displacement indicated by the user operation exceeds the threshold value.

If the operation content indicates a termination operation (S30), the program schedule control unit 109 proceeds to the processing in step S44.

In step S44, the program schedule control unit 109 notifies the rendering unit 115 of the end of the display, thereby causing it to terminate the display of the program schedule screen.

In the flowchart in FIG. 12 described above, in step S32, program schedule individual data are also generated for programs with channels and times surrounding the screen display region 180*a*, but this is not a limitation. The program schedule individual data generating unit 110 may, for example, generate program schedule individual data only for the programs included in the screen display region 180*a*.

In step S38 in the flowchart in FIG. 12 described above, when the program schedule screen is scrolled by a user operation, for channels and times corresponding to programs for which no program schedule individual data 160 has been generated yet, a predetermined background or the like may be displayed without displaying images of the programs on the program display screen.

The flowchart in FIG. 12 illustrates processing when there is user operation input, but when a given time elapses during the display of the program schedule and a broadcast program has ended, for example, the program schedule control unit 109 may update the time indicated at the display reference position to the current time and the processing in step S37 and the following steps may then be carried out.

As described above, the program schedule generating device 100 expands, in advance, the vector data needed as raw material data for dynamic generation of the program schedule display lists 170 defining combinations of multiple items of the program schedule individual data 160 used by the rendering unit 115 to generate the screen data, extracts information needed to generate the program schedule individual data 160 and program schedule display lists 170, and stores the information in the vector data management information storing unit 104, thereby enabling the data size of the program schedule individual data 160 and program schedule display lists 170 and the amount of processing required to generate them to be reduced.

In generating the program schedule individual data 160 for sixteen programs with 50 characters per program and an assumed average vector data size per character of 600 bytes, copies from the data storing unit 106 occur 800 times (=50 characters×16 programs). The total data size is about 470 kilobytes (=600 bytes×50 characters×16 programs). In the present embodiment, however, the first header information 160*a* and second header information 160*b* have a size of 8 bytes, at 8 bytes per character the graphic rendering definitions 160*c* total 400 bytes, and at 4 bytes per character the raw material data reference table 160*d* totals 200 bytes, making 608 bytes per program and less than 10 kilobytes for 16 programs.

In the embodiment described above, during a scroll operation the program schedule display list updating unit 112 updates the PL4 values in the program schedule display list 170, but instead, it may, for example, update the PL2 values in the program schedule display list 170, that is, the reference coordinates at which the screen display region 180*a* is placed.

The embodiment described above shows an example in which the invention is applied to a program schedule generating device 100, but the invention may also be applied to other devices, such as, for example, video receiving devices, video receiving and display devices, or video storing and reproducing devices.

Reference Characters

100 program schedule generating device, 101 reception processing unit, 102 program information receiving unit, 103 operation receiving unit, 104 vector data management information storing unit, 105 program information storing unit, 106 data storing unit, 107 base data storing unit, 108 control unit, 109 program schedule control unit, 110 program schedule individual data generating unit, 111 program schedule display list generating unit, 112 program schedule display list updating unit, 113 clock, 114 video memory, 115 rendering unit, 116 display unit.

What is claimed is:

1. A program schedule generating device, comprising:

a video memory for storing raw material data that are vector data for image rendering;

a program information storing unit for storing program data generating information for each program, including display information to be displayed in a program schedule;

a program schedule individual data generating unit for generating program schedule individual data for each program, including graphic rendering definitions for using the raw material data to form an image indicating the display information, and raw material data reference information indicating storage locations, in the video memory, of the raw material data used in the graphic rendering definitions;

a program schedule display list generating unit for generating a program schedule display list indicating, for each of the program schedule individual data, a position at which to place the image rendered on a basis of the program schedule individual data; and a rendering unit for rendering the image for each program by use of the raw material data on the basis of the program schedule individual data and placing the rendered image on a basis of the program schedule display list, thereby generating screen data for a program schedule screen.

2. The program schedule generating device of claim 1, wherein:

the program data generating information further includes information indicating a broadcast station and time of broadcast for each program;

the program information storing unit also stores display reference information indicating a broadcast station and a time used as a reference for display of the program schedule;

the program schedule individual data generating unit identifies channels and times in the program schedule on a basis of the display reference information and generates the program schedule individual data for each program broadcast on the identified channels at the identified times; and the program schedule display list generating unit generates the program schedule display list such that the image of the program broadcast by the broadcast station indicated by the display reference information at the time indicated by the display reference information is placed at a predetermined position.

3. The program schedule generating device of claim 2, further comprising:

a program information acquiring unit for receiving a digital broadcast signal and acquiring program information including information related to programs to be broadcast; and a program schedule control unit for updating the program data generating information on the basis of the program information acquired by the program information acquiring unit; wherein the program schedule individual data generating unit generates the program schedule individual data on a basis of the updated program data generating information.

4. The program schedule generating device of claim 3, further comprising a clock for keeping current time, wherein:

the program schedule control unit updates the time indicated by the display reference information such that the time indicated by the display reference information indicates the current time kept by the clock;

the program schedule individual data generating unit generates the program schedule individual data on a basis of the updated display reference information; and the program schedule display list generating unit generates the program schedule display list on the basis of the updated display reference information.

5. The program schedule generating device of claim 3, further comprising:

an operation receiving unit for receiving input of a scroll operation for the program schedule screen; and a program schedule display list updating unit for updating the program schedule display list; wherein the program schedule control unit updates at least one of the broadcast station and the time indicated by the display reference information, according to a displacement performed by the scroll operation; and the program schedule display list updating unit updates the program schedule display list such that the image of the program broadcast by the broadcast station indicated by the updated display reference information at time indicated by the updated display reference information is placed at the predetermined position.

6. The program schedule generating device of claim 5, wherein:

the program schedule individual data generating unit also generates the program schedule individual data for programs included in channels and times in a given range preceding and following the channels and times of the programs included in the program schedule screen;

the program schedule display list also indicates positions at which to place images rendered on a basis of the program individual data of the programs included in the channels and times within the given range preceding and following the channels and times of the programs in the program schedule screen; and the rendering unit does not render images on the basis of the program schedule individual data for programs that, on the basis of the program schedule display list, are not included in the program schedule screen.

7. The program schedule generating device of claim 5, wherein the program schedule individual data generating unit identifies the channels and the times in the program schedule on the basis of the updated display reference information and identifies the programs broadcast on the identified channels at the identified times, and if there is a program among the identified programs for which program schedule individual data have not been generated, generates the program schedule individual data for the program for which the program schedule individual data have not been generated.

8. The program schedule generating device of claim 7, wherein:

the program schedule display list generating unit newly generates a program schedule display list on the basis of the updated display reference information; and the rendering unit generates the screen data for the program schedule screen by placing the rendered images on a basis of the newly generated program schedule display list.

9. The program schedule generating device of claim 6, wherein:

the program schedule display list generating unit newly generates the program schedule display list on the basis of the updated display reference information when the displacement performed by the scroll operation exceeds a predetermined threshold value; and the rendering unit generates the screen data for the program schedule screen by placing the rendered images on a basis of the newly generated program schedule display list.

10. A program schedule generating method, comprising:

a program information storing process for storing program data generating information for each program, including display information to be displayed for each program in a program schedule;

a program schedule individual data generating process for generating program schedule individual data for each program, including graphic rendering definitions for using the raw material data to form an image indicating the display information, and raw material data reference information indicating storage locations, in the video memory, of the raw material data used in the graphic rendering definitions;

a program schedule display list generating process for generating a program schedule display list indicating, for each of the program schedule individual data, a position at which to place the image rendered on a basis of the program schedule individual data; and a rendering process for rendering the image for each program by use of the raw material data on the basis of the program schedule individual data and placing the rendered image on a basis of the program schedule display list, thereby generating screen data for a program schedule screen.

11. The program schedule generating method of claim 10, wherein:

the program data generating information further includes information indicating a broadcast station and a time of broadcast for each program;

the program schedule individual data generating process identifies channels and times in the program schedule on a basis of the display reference information and generates the program schedule individual data for each program broadcast on the identified channels at the identified times; and the program schedule display list generating process generates the program schedule display list such that the image of the program broadcast by the broadcast station indicated by the display reference information at the time indicated by the display reference information is placed at a predetermined position.

12. The program schedule generating method of claim 11, further comprising:

a program information acquiring process for receiving a digital broadcast signal and acquiring program information including information related to programs to be broadcast; and a program schedule control process for updating the program data generating information on the basis of the program information acquired by the program information acquiring process; wherein the program schedule individual data generating process generates the program schedule individual data on a basis of the updated program data generating information.

13. The program schedule generating method of claim 12, further comprising:

a clock process for keeping current time; and a second program data updating process for updating the time indicated by the display reference information such that the time indicated by the display reference information indicates the current time kept by the clock process; wherein the program schedule individual data generating process generates the program schedule individual data on a basis of the updated display reference information; and the program schedule display list generating process generates the program schedule display list on the basis of the updated display reference information.

14. The program schedule generating method of claim 12, further comprising:

an operation receiving process for receiving input of a scroll operation for the program schedule screen;

a third program data updating process for updating at least one of the broadcast station and the time indicated by the display reference information, according to a displacement performed by the scroll operation; and a program schedule display list updating process for updating the program schedule display list such that the image of the program broadcast by the broadcast station indicated by the updated display reference information at the time indicated by the updated display reference information is placed at the predetermined position.

15. The program schedule generating method of claim 14, wherein:

the program schedule individual data generating process also generates the program schedule individual data for programs included in channels and times within a given range preceding and following the channels and times of the programs included in the program schedule screen;

the program schedule display list also indicates positions at which to place images rendered on a basis of the program individual data of the programs included in the channels and times within the given range preceding and following the channels and times of the programs in the program schedule screen; and the rendering process does not render images on the basis of the program schedule individual data for programs that, on the basis of the program schedule display list, are not included in the program schedule screen.

16. The program schedule generating method of claim 14, further comprising a program schedule individual data regenerating process for identifying channels and the times in the program schedule on the basis of the updated display reference information, identifying programs broadcast on the identified channels at the identified times, and if there is a program among the identified programs for which program schedule individual data have not been generated, generating the program schedule individual data for the program for which the program schedule individual data have not been generated.

17. The program schedule generating method of claim 16, further comprising:

a program schedule display list generating process for newly generating the program schedule display list on the basis of the updated display reference information; and a re-rendering process for generating the screen data for the program schedule screen by placing the rendered images on the basis of the newly generated program schedule display list.

18. The program schedule generating method of claim 15, further comprising:

a program schedule display list regenerating process for newly generating the program schedule display list on the basis of the updated display reference information when the displacement performed by the scroll operation exceeds a predetermined threshold value; and a re-rendering process for generating the screen data for the program schedule screen by placing the rendered images on a basis of the newly generated program schedule display list.

* * * * *